Jan. 15, 1946.   A. J. ABRAMS ET AL   2,392,962
ALKYLATION PROCESS
Filed April 13, 1945
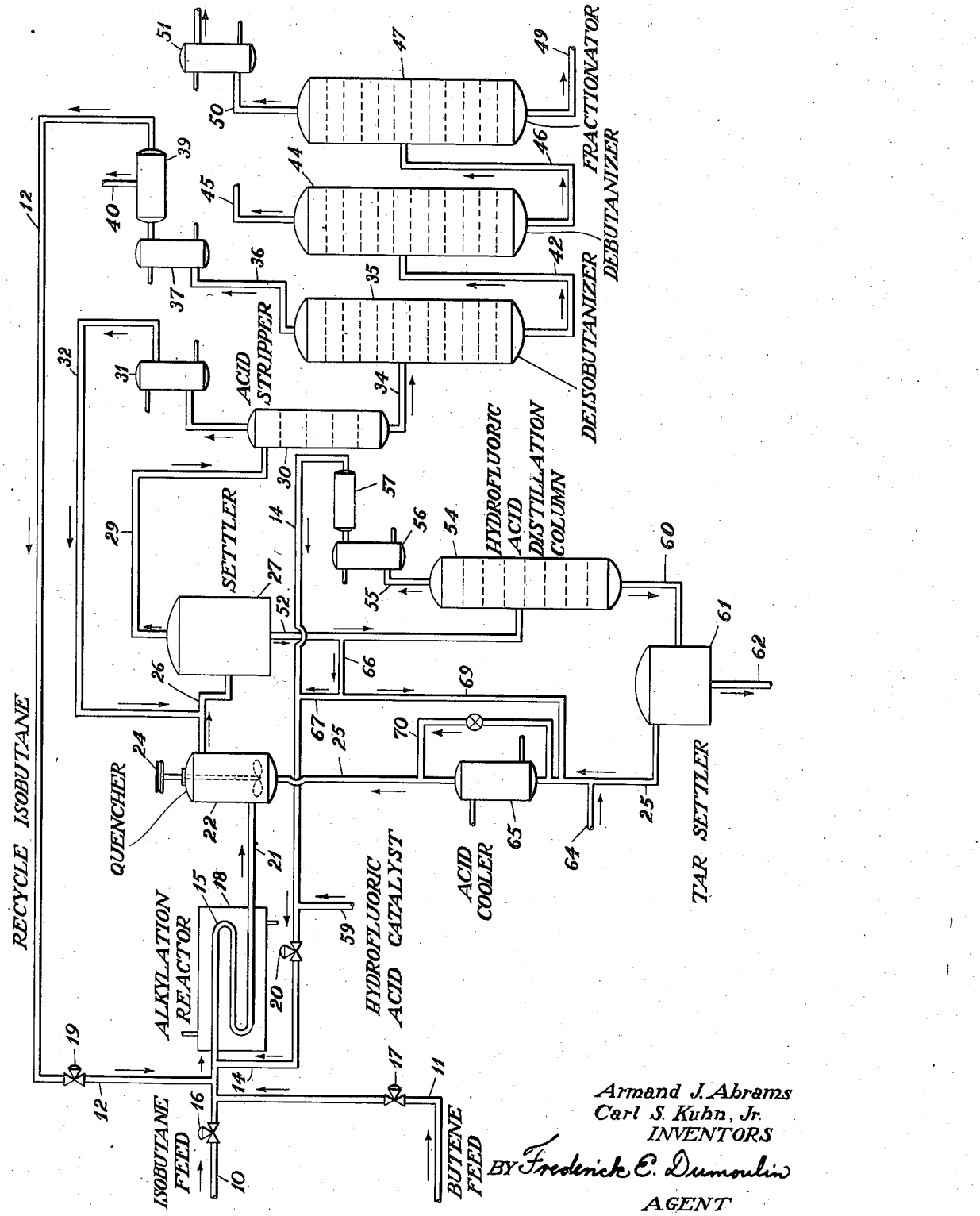
Armand J. Abrams
Carl S. Kuhn, Jr.
INVENTORS
BY Frederick E. Dumoulin
AGENT Patented Jan. 15, 1946

2,392,962

UNITED STATES PATENT OFFICE 2,392,962

ALKYLATION PROCESS

Armand J. Abrams and Carl S. Kuhn, Jr., Dallas, Tex., assignors, by mesne assignments, to Socony-Vacuum Oil Company, Incorporated, New York, N. Y., a corporation of New York Application April 13, 1945, Serial No. 588,214

17 Claims. (Cl. 260—683.4)

This invention relates to alkylation and relates more particularly to the alkylation of isoparaffins with olefins in the presence of liquid hydrofluoric acid.

As is well known, low boiling isoparaffins such as isobutane can be alkylated with low boiling olefins such as the butenes in the presence of liquid hydrofluoric acid catalyst to produce saturated branched chain hydrocarbons having desirable octane number, lead susceptibility, volatility characteristics, etc., making them highly important as aviation fuel and high quality motor fuel. This alkylation reaction is commonly carried out by feeding the isoparaffin and olefin to an alkylation reaction zone along with the hydrofluoric acid catalyst with which the hydrocarbons including the alkylate products are immiscible and intimately contacting the acid phase with the hydrocarbon phase through formation of an emulsion. The reaction emulsion is withdrawn from the alkylation reaction zone and sent to a separation zone wherein the acid phase and the hydrocarbon phase are separated by gravity settling. The acid phase is recycled to the alkylation reaction zone, and the hydrocarbon phase is fractionated to separate the excess isoparaffin reactant from the alkylate product for recycling.

Heretofore, it has been considered that the primary factors affecting the yield and quality of the alkylate product were the ratio of isoparaffin to olefin, the temperature of the reaction, and the concentration, expressed as titratable acidity, of the hydrofluoric acid catalyst. It has been recently discovered, however, that the reaction time, i. e., the total time during which the hydrocarbon reactants and alkylate products are in contact with the hydrofluoric acid catalyst, is an extremely important variable. In isobutane alkylation, for example, as disclosed in the copending applications, Serial No. 546,111, filed July 22, 1944, and Serial No. 565,794, filed November 29, 1944, the reaction time employed greatly affects the yield and quality of the alkylate product and that, in certain instances as hereinafter indicated, maximum yields of highest quality products are obtained only by employing short reaction times, as, for example, reaction times of but a few seconds. Thus, a careful control of reaction time is essential when short reaction times are required to obtain high yields of high quality products. While, with the usual types of commercial alkylation reactors, a satisfactory control of the reaction time may be obtained in the reactor per se, a further reaction time is involved in the separation zone wherein the acid and hydrocarbons may be in contact with each other for a period of from about 30 seconds to 2 minutes, depending upon the design of the separation zone and the temperature of operation, before the emulsion completely separates. Accordingly, the time required for separation of the acid catalyst from the hydrocarbons imposes a limiting factor upon control of the reaction time and consequently imposes a limiting factor upon the benefits to be obtained thereby.

It is an object of this invention to provide a new and improved alkylation process. It is another object of this invention to provide a method for controlling reaction time in alkylation reactions employing hydrofluoric acid catalyst. It is another object of this invention to provide a method for obtaining very short reaction times in hydrofluoric acid catalyzed alkylation reactions. It is another object of this invention to provide a process for obtaining maximum yields of highest quality product from isoparaffin-olefin alkylation reactions wherein hydrofluoric acid is employed as the catalytic agent. Further objects and advantages of the invention will become apparent from the following description thereof.

In carrying out the invention, hydrofluoric acid and isoparaffin-olefin alkylation reactants are continuously passed to and withdrawn from an alkylation reaction zone under conditions of flow such that the acid and hydrocarbons are maintained in intimate contact for a desired predetermined period of time. After leaving the reaction zone and after the acid and hydrocarbons have been in contact for the desired predetermined period of time, the hydrofluoric acid catalyst contained in the reaction mixture is diluted to a concentration with respect to water below which the hydrofluoric acid is ineffective as an alkylation catalyst. For diluting the hydrofluoric acid catalyst to below its effective catalyst concentration, the reaction mixture may be admixed with water, but, for reasons of economy, the reaction mixture is preferably admixed with recycle dilute aqueous hydrofluoric acid obtained in the manner hereinafter indicated. The reaction mixture containing the quenched acid is then separated into an aqueous acid phase and a hydrocarbon phase by conventional means and the hydrocarbon phase is subjected to conventional treatment for removal and recycling of excess isoparaffin reactant and recovery and purification of alkylate product. The aqueous hydrofluoric acid phase is subjected to fractionation to remove an overhead hydrofluoric acid fraction of catalyst concentration which is recycled as catalyst to the alkylation reaction zone and to remove a bottoms fraction of dilute aqueous hydrofluoric acid below catalyst concentration which is recycled for dilution of the catalyst acid in the reaction mixture to stop further catalytic action.

The essential element of the process of the invention resides in the dilution of the hydrofluoric acid catalyst contained in the reaction mixture to a concentration with respect to water below the effective catalyst concentration at the end of the desired predetermined reaction time. By thus diluting the catalyst, the alkylation reaction may be substantially instantaneously stopped at any desired moment and control of the reaction time within narrow limits is thereby obtained. A particular feature of the invention resides in the use of dilute aqueous acid to stop the activity of the catalyst since thereby no loss of hydrofluoric acid in the form of its constant boiling mixture with water is incurred, as will hereinafter become more apparent, and a continuous alkylation process with positive control of reaction time is provided.

The extent to which the acid catalyst contained in the reaction mixture must be diluted to stop its catalytic activity is a function of the temperature of the reaction mixture and, to some extent, the amount of hydrocarbons and hydrocarbon polymers dissolved in the catalyst. At higher temperatures, a greater dilution of the catalyst is required to quench its activity than at lower temperatures. Thus, for example, at temperatures of 10° C., dilution of the catalyst to a concentration below about 90% by weight has been found to stop effectively its activity, while at higher temperatures dilution to a lower concentration will be required. Generally, for temperatures up to about 50° C., the reaction may be stopped by dilution to a concentration below about 75% by weight of hydrofluoric acid. However, as before mentioned, the amount of hydrocarbons and hydrocarbon polymers dissolved in the catalyst also affects the concentration to which the catalyst must be diluted to stop its activity, and the concentrations mentioned above will vary to a greater or lesser extent in any particular case depending upon the amounts of dissolved hydrocarbons and polymers. From the standpoint of economy of operation, it is desirable to dilute the acid catalyst to a concentration no lower than is necessary to quench its catalytic activity since thereby the amount of quenched acid to be fractionated into recycle catalyst and quenching acid is kept at a minimum, and the amount of quenching acid to be recycled is minimized.

It will be understood that hereinabove as well as hereinafter, unless otherwise specified, by weight per cent of hydrofluoric acid is meant the actual weight per cent of hydrofluoric acid in the acid-water mixtures and not the weight per cent of acid expressed as titratable acidity since the titratable acidity varies with the amount of dissolved hydrocarbons and hydrocarbon polymer contained in the acid-water mixtures, irrespective of the actual hydrofluoric acid concentration, and is not a true measure of the actual hydrofluoric acid concentration.

Isoparaffin-olefin alkylation is a complex reaction apparently involving first the formation of primary alkylate products by condensation of the isoparaffin with the olefin followed by secondary reactions catalyzed by the hydrofluoric acid and involving isomerization and disproportionation of the primary alkylate products to produce secondary alkylate products. Side reactions also occur involving polymerization of the olefin, hydrogen exchange between the olefin and the isoparaffin and between the olefin polymer and the isoparaffin, alkylation of the isoparaffin with products of the hydrogen exchange reactions, etc. Generally, in alkylation reactions wherein branched-chain olefins or olefins having the double bond in a non-terminal position are employed, the primary alkylate products are the more desirable products, while, in alkylation reactions wherein olefins, except propylene, having the double bond in a terminal position, are employed, certain of the secondary products and products of the side reactions are the more desirable products. Propylene behaves like the branched chain and non-terminal double bond olefins in that generally the primary alkylate product is more desirable than its isomers having a straight chain containing the same number of carbon atoms from the standpoint of octane rating. The various reactions take place at different rates and the temperature of reaction affects each of these rates. Thus, for each type of olefin and for each temperature of reaction, proper selection of the reaction time must be made in order to obtain the desired products in maximum amounts possible whether the primary products or the secondary and side reaction products are desired, as the case may be.

In isobutane-propylene alkylation, the primary alkylate product, 2,3-dimethylpentane, is a more desirable product than the principal secondary reaction product, 2,4-dimethylpentane, produced for example by isomerization of the primary alkylate product. The primary alkylation reaction takes place rapidly as compared with the secondary isomerization reaction, and a reaction time may, therefore, be selected to permit the primary reaction to go substantially to completion before the secondary reaction has gone to such an extent as to form sufficient quantities of the undesirable secondary reaction product to decrease the average quality of the alkylate product obtained. The following table gives the preferred range of reaction times for various temperatures, as determined by the method disclosed in the aforementioned copending application, Serial Number 546,111, whereby 2,3-dimethylpentane is obtained as the major constituent of the total alkylate product and a yield of total alkylate of at least 180% on the basis of weight of propylene converted is obtained.

Table I

| Temperature, °C. | Reaction time |
| --- | --- |
| | Minutes |
| 50 | 0.02–0.08 |
| 40 | 0.07–0.36 |
| 30 | 0.35–1.78 |
| 20 | 2–10 |

In isobutane-butene alkylation, the product desired depends upon the olefin employed. Where isobutene or butene-2 is the olefin employed, the primary alkylate products, trimethylpentanes, are the more desirable products, and the secondary isomerization reaction results in the formation of less highly branched and therefore less desirable octanes, and the secondary reaction of disproportionation results in the formation of less desirable heptanes, nonanes, etc. On the other hand, where butene-1 is the olefin employed, the primary alkylate products are of poor quality containing considerable quantities of dimethylhexanes, whereas the secondary reaction of isomerization results in the formation of products of improved quality. However, the other secondary reaction, disproportionation, as in the case of isobutene and butene-2, results in the formation of products of poor quality. Thus, where isobutene or butene-2 is employed, the reaction time is selected to permit the primary reaction to go as far as possible towards completion before the secondary reactions of isomerization and disproportionation have gone to a sufficient extent to result in a decrease in the average quality of the product obtained. Where butene-1 is employed, the reaction time is selected to permit the secondary reaction of isomerization to go as far as possible towards completion before the secondary reaction of disproportionation has gone to an extent sufficient to decrease the average quality and yield of the product obtained.

In commercial isobutane-butene alkylation reactions, butane-butene mixtures, obtained for example by partial dehydrogenation of butane fractions separated from natural gas or straight run naphthas, fractionation of cracking still gases, etc., and containing butene-1, butene-2, and isobutene in vary proportions, are ordinarily employed as feed stock. When employing these mixtures, the reaction time required to obtain the highest yields of the desired products will depend upon the ratio of the amount of butene-1 contained in the mixtures to the amount of butene-2 plus isobutene, and for each temperature will lie between the time required for pure butene-1 and the time required for pure butene-2 and isobutene. The following table gives the preferred range of reaction times, as determined by the method disclosed in the other of the aforementioned copending applications, Serial Number 565,794, for pure butene-2 or isobutene and for a butane-butene mixture containing by volume in the olefinic portion of the mixture 51% butene-1, 14% butene-2, and 35% isobutene.

*Table II*

| Temperature, ° C. | Reaction time | |
|---|---|---|
| | Butane-butene mixtures | Butene-2 or isobutene |
| | *Minutes* | *Minutes* |
| 50 | 0.004 to 0.1 | 0.0005 to 0.01 |
| 40 | 0.02 to 0.4 | 0.002 to 0.05 |
| 30 | 0.06 to 1.6 | 0.008 to 0.20 |
| 20 | 0.25 to 6.3 | 0.04 to 1.1 |
| 10 | 1.6 to 39.4 | 0.19 to 4.7 |

Where butane-butene mixtures containing lesser proportions of butene-1 than the mixture mentioned above are employed, as will usually be encountered since the mixture mentioned above has a comparatively high butene-1 content, the desired reaction time will lie proportionately between the times indicated in Table II for the mixture and for pure butene-2 or isobutene.

The alkylation reaction may be carried out in any suitable type of reactor wherein control of the time during which the acid and hydrocarbons are within the reactor may be obtained. Where reaction times of about a minute or more are indicated, the usual type of multi-pass reactor, as, for example, a "Stratco contactor," may be employed. However, where reaction times of less than a minute are indicated, a single pass reactor is preferred.

Dilution of the acid catalyst in the reaction mixture may be effected by admixing the aqueous hydrofluoric acid with the reaction mixture in the outlet line of the alkylation reactor or may be effected by passing the reaction mixture to a quenching vessel wherein the admixture may take place. Where the quenching acid is admixed with the reaction mixture in the outlet line of the alkylation reactor, turbulent flow is preferably maintained in order to obtain rapid and thorough admixture of quenching acid and reaction mixture. Where a separate quenching apparatus is desired, any suitable type of apparatus wherein rapid and thorough admixture can be obtained may be employed, as, for example, an enclosed vessel provided with means for agitating the reaction mixture and quenching acid, such as a circulating pump, stirrer, turbo-mixer, etc.

In carrying out the process of the invention, the velocity of flow through the reactor is regulated so that the acid and hydrocarbons are in contact for the predetermined desired reaction time at the time of admixture with the aqueous quenching acid. This may be readily accomplished by control of the feed rate of acid and hydrocarbon reactants to the alkylation reactor taking into account the reactor volume. Thus, for a given reactor volume including the volume of the reactor effluent line to the point of effective quenching, the total feed rate of acid and hydrocarbon reactants for a desired reaction time may be determined by dividing the reactor volume by the feed rate expressed in volumes per unit time.

Following quenching of the catalyst, the mixture of quenched catalyst and hydrocarbons is passed to a separation zone, as, for example, a gravity settler, for separation of the quenched acid from the hydrocarbons. The hydrocarbons are removed from the separation zone and may thereafter be treated in accordance with conventional procedures for removal of dissolved hydrofluoric acid, removal and recycling of excess isoparaffin, recovery of alkylate product, etc.

The quenched acid phase separated from the hydrocarbon phase in the separation zone is subjected to fractionation for separation of an overhead fraction having a concentration of hydrofluoric acid at least sufficiently high to be effective as catalyst, and a bottoms fraction having a concentration of hydrofluoric acid below the concentration effective as catalyst. The overhead fraction is recycled to the alkylation reactor, and the bottoms fraction is recycled as quenching acid to the alkylation reactor effluent. The total amount of quenched acid from the separation zone may be thus subjected to fractionation, or the quenched acid from the separation zone may be divided into two streams, if desired, and one stream subjected to fractionation as described. The other stream may be admixed with the overhead fraction from the fractionation operation and recycled to the alkylation reactor, or may be admixed with the bottoms fraction from the fractionation operation and recycled to the quenching operation, or the stream may be divided into two portions, one portion being admixed with the overhead fraction and the other portion being admixed with the bottoms fraction. Where the latter procedures are employed, it will be understood, of course, that the proportion of quenched acid admixed with the overhead fraction and the hydrofluoric acid concentration of both the overhead fraction and the quenched acid must be such that the hydrofluoric acid concentration of the resultant mixture entering the alkylation reactor is within the effective catalyst concentration. The same considerations apply with respect to the resultant mixture recycled to the quenching operation in order that this mixture have a hydrofluoric acid concentration below the effective catalyst concentration. The selection of the factors involved may be readily made by those skilled in the art on the basis of material balances and economy of operation.

Hydrofluoric acid and water form a maximum boiling azeotropic mixture, i. e., a mixture having a boiling point higher than the boiling point of either hydrofluoric acid or water alone. At atmospheric pressure, this azeotropic mixture boils at about 120° C. and has a composition of approximately 36 weight per cent hydrofluoric acid and 64 weight per cent water. As previously indicated, the quenched acid subjected to fractionation will ordinarily have a hydrofluoric acid content of not below about 75 weight per cent and, since the hydrofluoric acid boils at atmospheric pressure at about 19° C., as compared with 120° C. for the azeotropic mixture, separation of substantially anhydrous hydrofluoric acid as an overhead fraction and azeotropic mixture as a bottoms fraction may be readily attained.

Fractionation of the quenched acid from the settler need not be carried out, however, to provide an overhead fraction of substantially anhydrous acid and a bottoms fraction of azeotropic mixture, but the fractionation may be carried out to obtain an overhead fraction of any desired concentration of hydrofluoric acid, provided the concentration is within the range of effective catalyst concentration, or, where a portion of the quenched acid is recycled directly to the alkylation reactor after admixture with the overhead fraction, sufficiently high to bring the hydrofluoric acid concentration of the mixture entering the alkylation reactor within the effective catalyst range. Furthermore, the fractionation may be carried out to obtain a bottoms fraction of any desired concentration of hydrofluoric acid above 36 weight per cent. Generally, where the total amount of quenched acid is subjected to fractionation, the fractionation may be carried out to provide an overhead fraction of 90 to 100 weight per cent hydrofluoric acid and a bottoms fraction of 36 to 65 weight per cent hydrofluoric acid. Where a portion of the quenched acid is recycled directly to the alkylation reactor, the fractionation is preferably carried out to obtain an overhead fraction of at least 95 weight per cent hydrofluoric acid.

The considerations governing the selection of the hydrofluoric acid concentration of the overhead catalyst fraction and the bottoms quenching fraction involve the concentration of acid desired to be employed as catalyst in the alkylation reaction, the cost of the fractionating equipment, the cost of operating the fractionating equipment, the cost of recycling the catalyst and quenching fractions, the concentrations to which the acid contained in the reactor effluent is to be diluted, etc., and the selection of the concentrations of the two fractions can be readily made on the basis of these considerations by those skilled in the art. After operations have been set up for any given concentration in the two fractions, a material balance will be maintained, and it will be only necessary to add a small amount of make-up hydrofluoric acid to the system to compensate for any loss that may be encountered. The addition of make-up water will seldom be necessary since generally enough will be picked up from water in the hydrocarbon feed reactants to compensate for any losses.

In order to prevent excessive rise in temperature of the reactor effluent upon admixture with the aqueous quenching acid as a result of the heat evolved by dilution of the hydrofluoric acid contained in the reactor effluent, it is desirable to cool at least a portion of the quenching acid prior to admixture with the reactor effluent. Cooling may be carried out to any desired temperature above the freezing point of the quenching acid which in the case of the azeotropic mixture is about −16° C. Quenching acid having a concentration of hydrofluoric acid higher than that of the azeotropic mixture will, of course, have a lower freezing point. Generally, cooling may be carried out just sufficiently to compensate for the rise in temperature of the reactor effluent upon dilution, and cooling to temperatures between −16° C. and 0° C. is satisfactory depending upon the volume of quenching acid employed per volume of reactor effluent, the proportion of the total amount of quenching acid cooled, and the rise in temperature of the reactor effluent.

All apparatus coming in contact with the aqueous quenching acid and/or the quenched acid catalyst, i. e., the quenching vessel when such is employed, the quenched acid catalyst fractionation equipment, the tar settler, the heat exchanger for cooling the recycle quenching acid, connecting pipe lines, valves, etc., should be constructed of materials resistant to the corrosive action of dilute hydrofluoric acid. Suitable materials of construction for this apparatus include monel metal or other alloys such as the "Hastelloys" which contain a high percentage of nickel. Apparatus coming in contact with the relatively concentrated catalyst acid, such as the alkylation reactor, may be constructed of the usual materials employed in the alkylation art, as, for example, low carbon steel or copper.

In carrying out the alkylation reaction per se, any suitable reaction conditions with respect to isoparaffin-olefin ratio, acid-hydrocarbon ratio, and titratable acidity of catalyst may be employed. Thus, for example, where the process of the invention is applied to the alkylation of isobutane with butenes, an isoparaffin-olefin volume ratio of about 2 to 1 to 15 to 1, an acid-hydrocarbon volume ratio of between about 1 to 2 and 2 to 1, or higher, and hydrofluoric acid having a titratable acidity of between about 82 per cent and 100 per cent may be employed. The same reaction conditions may be employed in the case of isobutane-propylene alkylation although it may be found desirable to employ hydrofluoric acid having a titratable acidity higher than about 82 per cent. Similarly, in the case of other alkylation reactions, such as the alkylation of isopentane with propylene, butylene, etc., any suitable alkylating conditions may be employed.

The accompanying drawing is a flow sheet schematically illustrating one method of carrying out the process of the invention in connection with isobutane-butene alkylation.

Referring now to the drawing, isobutane feed enters the system through line 10 and is admixed with butene feed entering the system through line 11. The combined feeds are then admixed with recycle isobutane from line 12 and recycle hydrofluoric acid from line 14 and passed to alkylation reactor 15. To control the reaction time in the reactor 15, the rates of flow of the four streams may be regulated by means of flow control valves 16, 17, 19, and 20 in lines 10, 11, 12, and 14, respectively. The alkylation reactor is illustrated as being of the single pass type provided with an external jacket 18 through which a suitable temperature controlling medium may be passed, although, as mentioned hereinbefore, any suitable type of alkylation reactor may be employed. The rates of flow of the streams of isobutane, butene, and hydrofluoric acid being controlled, the reaction mixture passes through the alkylation reactor at the desired rate and the effluent leaving the reactor through line 21 enters quencher 22 provided with stirrer 24 at the end of the desired reaction time. The effluent in the quencher 22 is admixed with cooled dilute aqueous quenching acid entering the quencher through line 25 and the mixture is then passed through line 26 to settler 27 where the mixture separates into an upper hydrocarbon layer and a lower aqueous acid layer.

The hydrocarbon layer is passed from settler 27 through line 29 to acid stripper 30 where any acid and water, dissolved or suspended, is stripped from the hydrocarbons as overhead and returned after condensation in condenser 31 to the settler 27 through line 32 connected with line 26. The bottoms from stripper 30 are passed through line 34 to deisobutanizer 35 for removal of isobutane. Prior to entering the deisobutanizer, the bottoms from stripper 30 may be subjected to chemical treatment as by passing through a reactor packed with bauxite (not shown) to remove residual traces of hydrofluoric acid and organic fluorides. The isobutane is removed as overhead through line 36 and after condensation in condenser 37 passed to accumulator 39 from which it is recycled through line 12 to the alkylation reactor 15. Light gases are vented from the system through line 40. The bottoms from deisobutanizer 35 are passed through line 42 to debutanizer 44 where normal butane formed during the reaction or which may have been contained in the feed hydrocarbons is removed as overhead through line 45. The debutanizer bottoms are passed through line 46 to fractionator 47 where the alkylate product is separated into aviation alkylate and heavy alkylate. The heavy alkylate is removed as bottoms through line 49, and the aviation alkylate is removed as overhead through line 50 and condensed in condenser 51.

The aqueous acid layer in settler 27 is removed through line 52 and passed to hydrofluoric acid fractionation column 54 where it is separated into an overhead fraction containing hydrofluoric acid in sufficient concentration to be effective as catalyst and a bottoms fraction of aqueous quenching acid. The overhead catalyst fraction is passed through line 55 to condenser 56 and after condensation passed to accumulator 57 from which it is recycled through line 14 to the alkylation reactor 15. Line 59 is connected with line 14 for the addition of make up hydrofluoric acid to the system to replace that which may be lost or removed in the form of alkyl fluorides. The bottoms fraction from the column 54 is passed through line 60 to tar settler 61 wherein any tar contained in the bottoms fraction is separated therefrom and removed through line 62. The quenching acid is then passed through line 25 containing line 64 for the addition of any make up water which may be required and, after cooling in cooler 65, passed to the quencher 22.

Various modifications may be made in the above described procedures. For example, as hereinbefore indicated, the entire portion of quenched acid from the settler 27 need not be passed to the fractionation column 54, but a portion may be removed through line 66 from line 52 and part recycled to the alkylation reactor through line 67 connected to line 14 and the remainder recycled to the quencher through line 69 connected to line 25, or all may be recycled to the alkylation reactor or all may be recycled to the quencher. Additionally, only a portion of the quenching acid in line 25 need be cooled in cooler 65, the remainder being passed through by-pass line 70. Other modifications will be readily apparent to those skilled in the art.

Having thus described our invention, it will be understood that such description has been given by way of illustration and example only and not by way of limitation, reference being had for the latter purpose to the appended claims.

We claim:

1. A process of controlling reaction time in a hydrofluoric acid catalyzed isoparaffin-olefin alkylation reaction comprising diluting the hydrofluoric acid catalyst contained in the alkylation reaction mixture to a concentration below its effective catalyst concentration by admixing water therewith at the end of a predetermined reaction time.

2. In an alkylation process wherein an isoparaffin, an olefin, and hydrofluoric acid catalyst are intimately contacted in an alkylation reaction zone, the improvement comprising diluting the hydrofluoric acid contained in the resulting reaction mixture to a concentration below its effective catalyst concentration by admixing water therewith at the end of a predetermined reaction time whereby effective control of the total reaction time is obtained.

3. In a continuous alkylation process wherein an isoparaffin, an olefin, and hydrofluoric acid catalyst are maintained in intimate contact in an alkylation reaction zone for a predetermined reaction time, reaction mixture of hydrocarbons and hydrofluoric acid catalyst removed from said alkylation reaction zone, and alkylate product recovered from said reaction mixture, the improvement comprising diluting said hydrofluoric acid contained in said reaction mixture at the end of said predetermined reaction time to a concentration below its effective catalyst concentration by admixing water therewith in a mixing zone whereby the alkylation reaction is substantially instantaneously stopped.

4. In a continuous alkylation process wherein an isoparaffin, an olefin, and hydrofluoric acid catalyst are maintained in intimate contact in an alkylation reaction zone for a predetermined reaction time, reaction mixture of hydrocarbons and hydrofluoric acid catalyst removed from said alkylation reaction zone, and alkylate product recovered from said reaction mixture, the improvement comprising diluting said hydrofluoric acid contained in said reaction mixture at the end of said predetermined reaction time to a concentration below its effective catalyst concentration by admixing dilute aqueous hydrofluoric acid therewith in a mixing zone whereby the alkylation reaction is substantially instantaneously stopped.

5. In a continuous alkylation process wherein an isoparaffin, an olefin, and hydrofluoric acid catalyst are maintained in intimate contact in an alkylation reaction zone for a predetermined reaction time, reaction mixture of hydrocarbons and hydrofluoric acid catalyst removed from said alkylation reaction zone, and alkylate product recovered from said reaction mixture, the improvement comprising diluting said hydrofluoric acid contained in said reaction mixture at the end of said predetermined reaction time to a concentration below its effective catalyst concentration by admixing dilute aqueous hydrofluoric acid therewith in a mixing zone, separating inactive hydrofluoric acid from the resulting mixture, separating at least a portion of said inactive hydrofluoric acid into a hydrofluoric acid fraction of catalyst concentration and an aqueous hydrofluoric acid fraction below catalyst concentration, recycling said hydrofluoric acid fraction of catalyst concentration to said alkylation reaction zone, and recycling said aqueous hydrofluoric acid fraction below catalyst concentration to said mixing zone.

6. In a continuous alkylation process wherein an isoparaffin, an olefin, and hydrofluoric acid catalyst are maintained in intimate contact in an alkylation reaction zone for a predetermined reaction time, reaction mixture of hydrocarbons and hydrofluoric acid catalyst removed from said alkylation reaction zone, and alkylate product recovered from said reaction mixture, the improvement comprising diluting said hydrofluoric acid contained in said reaction mixture at the end of said predetermined reaction time to a concentration below its effective catalyst concentration by admixing dilute aqueous hydrofluoric acid therewith in a mixing zone, separating inactive hydrofluoric acid from the resulting mixture, separating at least a portion of said inactive hydrofluoric acid into a hydrofluoric acid fraction of catalyst concentration and an aqueous hydrofluoric acid fraction below catalyst concentration, recycling said hydrofluoric acid fraction of catalyst concentration to said alkylation reaction zone, cooling at least a portion of said aqueous hydrofluoric acid fraction below catalyst concentration, and recycling said aqueous hydrofluoric acid fraction below catalyst concentration to said mixing zone.

7. A continuous alkylation process comprising contacting an isoparaffin, an olefin, and hydrofluoric acid catalyst in an alkylation reaction zone for a predetermined reaction time, diluting the hydrofluoric acid in the reaction mixture so formed with dilute aqueous hydrofluoric acid to a concentration below its effective catalyst concentration at the end of said predetermined reaction time in a mixing zone, separating the resulting mixture into an aqueous hydrofluoric acid phase and a hydrocarbon phase, recovering alkylate product from said hydrocarbon phase, separating at least a portion of said aqueous hydrofluoric acid phase into a hydrofluoric acid fraction of catalyst concentration and an aqueous hydrofluoric acid fraction below catalyst concentration, recycling said hydrofluoric acid fraction of catalyst concentration to said alkylation reaction zone, and recycling said aqueous hydrofluoric acid fraction below catalyst concentration to said mixing zone.

8. The process of claim 7 wherein the isoparaffin is isobutane and the olefin is a butene.

9. The process of claim 7 wherein the isoparaffin is isobutane and the olefin is isobutene.

10. The process of claim 7 wherein the isoparaffin is isobutane and the olefin is butene-2.

11. The process of claim 7 wherein the isoparaffin is isobutane and the olefin is propylene.

12. A continuous alkylation process comprising contacting an isoparaffin, an olefin, and hydrofluoric acid catalyst in an alkylation reaction zone for a predetermined reaction time, diluting the hydrofluoric acid in the reaction mixture so formed with dilute aqueous hydrofluoric acid to a concentration below its effective catalyst concentration at the end of said predetermined reaction time in a mixing zone, separating the resulting mixture into an aqueous hydrofluoric acid phase and a hydrocarbon phase, recovering alkylate product from said hydrocarbon phase, separating at least a portion of said aqueous hydrofluoric acid phase into a hydrofluoric acid fraction of catalyst concentration and an aqueous hydrofluoric acid fraction below catalyst concentration, recycling said hydrofluoric acid fraction of catalyst concentration to said alkylation reaction zone, cooling at least a portion of said aqueous hydrofluoric acid fraction below catalyst concentration, and recycling said aqueous hydrofluoric acid fraction below catalyst concentration to said mixing zone.

13. A continuous alkylation process comprising contacting an isoparaffin, an olefin, and hydrofluoric acid catalyst in an alkylation reaction zone for a predetermined reaction time, diluting the hydrofluoric acid in the reaction mixture so formed with dilute aqueous hydrofluoric acid to a concentration below its effective catalyst concentration at the end of said predetermined reaction time in a mixing zone, separating the resulting mixture into an aqueous hydrofluoric acid phase and a hydrocarbon phase, recovering alkylate product from said hydrocarbon phase, separating said aqueous hydrofluoric acid phase into a hydrofluoric acid fraction of catalyst concentration and an aqueous hydrofluoric acid fraction below catalyst concentration, recycling said hydrofluoric acid fraction of catalyst concentration to said alkylation reaction zone, and recycling said aqueous hydrofluoric acid fraction below catalyst concentration to said mixing zone.

14. A continuous alkylation process comprising contacting an isoparaffin, an olefin, and hydrofluoric acid catalyst in an alkylation reaction zone for a predetermined reaction time, diluting the hydrofluoric acid in the reaction mixture so formed with dilute aqueous hydrofluoric acid to a concentration below its effective catalyst concentration at the end of said predetermined reaction time in a mixing zone, separating the resulting mixture into an aqueous hydrofluoric acid phase and a hydrocarbon phase, recovering alkylate product from said hydrocarbon phase, recycling a portion of said aqueous hydrofluoric acid phase to said alkylation reaction zone, separating the remaining portion of said aqueous hydrofluoric acid phase into a hydrofluoric acid fraction of catalyst concentration and an aqueous hydrofluoric acid fraction below catalyst concentration, recycling said hydrofluoric acid fraction of catalyst concentration to said alkylation reaction zone, and recycling said aqueous hydrofluoric acid fraction below catalyst concentration to said mixing zone.

15. A continuous alkylation process comprising contacting an isoparaffin, an olefin and hydrofluoric acid catalyst in an alkylation reaction zone for a predetermined reaction time, diluting the hydrofluoric acid in the reaction mixture so formed with dilute aqueous hydrofluoric acid to a concentration below its effective catalyst concentration at the end of said predetermined reaction time in a mixing zone, separating the resulting mixture into an aqueous hydrofluoric acid phase and a hydrocarbon phase, recovering alkylate product from said hydrocarbon phase, recycling a portion of said aqueous hydrofluoric acid phase to said mixing zone, separating the remaining portion of said aqueous hydrofluoric acid phase into a hydrofluoric acid fraction of catalyst concentration and an aqueous hydrofluoric acid fraction below catalyst concentration, recycling said hydrofluoric acid fraction of catalyst concentration to said alkylation reaction zone, and recycling said aqueous hydrofluoric acid fraction below catalyst concentration to said mixing zone.

16. A continuous alkylation process comprising contacting an isoparaffin, an olefin, and hydrofluoric acid catalyst in an alkylation reaction zone for a predetermined reaction time, diluting the hydrofluoric acid in the reaction mixture so formed with dilute aqueous hydrofluoric acid to a concentration below its effective catalyst concentration at the end of said predetermined reaction time in a mixing zone, separating the resulting mixture into an aqueous hydrofluoric acid phase and a hydrocarbon phase, recovering alkylate product from said hydrocarbon phase, recycling a portion of said aqueous hydrofluoric acid phase to said alkylation reaction zone, recycling another portion of said aqueous hydrofluoric acid phase to said mixing zone, separating the remainder of said aqueous hydrofluoric acid phase into a hydrofluoric acid fraction of catalyst concentration and an aqueous hydrofluoric acid fraction below catalyst concentration, recycling said hydrofluoric acid fraction of catalyst concentration to said alkylation reaction zone, and recycling said aqueous hydrofluoric acid fraction below catalyst concentration to said mixing zone.

17. A continuous alkylation process comprising contacting an isoparaffin, an olefin, and hydrofluoric acid catalyst in an alkylation reaction zone for a predetermined reaction time, diluting the hydrofluoric acid catalyst in the reaction mixture so formed at the end of said predetermined reaction time to a concentration between 90 weight per cent of hydrofluoric acid at a temperature of the reaction mixture of 10° C. and 75 weight per cent of hydrofluoric acid at a temperature of the reaction mixture of 50° C. by admixing therewith in a mixing zone a sufficient quantity of aqueous hydrofluoric acid having a concentration of between about 36 and 65 weight per cent of hydrofluoric acid, separating the resulting mixture into an aqueous hydrofluoric acid phase and a hydrocarbon phase, recovering alkylate product from said hydrocarbon phase, separating at least a portion of said aqueous hydrofluoric acid phase into a hydrofluoric acid fraction of catalyst concentration and a fraction having a hydrofluoric acid concentration of between about 36 and 65 weight per cent, recycling said fraction of catalyst concentration to said alkylation reaction zone, and recycling said fraction having a hydrofluoric acid concentration of between about 36 and 65 weight per cent to said mixing zone after cooling at least a portion of said fraction to a temperature between −16° C. and 0° C.

ARMAND J. ABRAMS.
CARL S. KUHN, Jr.